United States Patent [19]

Scavone

[11] Patent Number: 4,827,773

[45] Date of Patent: May 9, 1989

[54] MEASURING ALIGNMENT OF LOADING FIXTURE

[75] Inventor: Donald W. Scavone, 57 Rip Van La., Saratoga Springs, N.Y. 12866-9055

[73] Assignee: The United States of America as represented by the United States Department of Energy, Washington, D.C.

[21] Appl. No.: 166,579

[22] Filed: Mar. 10, 1988

[51] Int. Cl.[4] .......................... G01B 7/31; G01L 5/00; G01L 25/00; G01D 18/00
[52] U.S. Cl. ......................................... 73/795; 73/860
[58] Field of Search .............. 73/1 B, 795, 860, 865.9, 73/1 R, 1 E

[56] References Cited

U.S. PATENT DOCUMENTS

| | | |
|---|---|---|
| 2,290,868 | 7/1942 | Eriksson . |
| 2,356,763 | 8/1944 | Keinath . |
| 2,534,980 | 12/1950 | Lubahn . |
| 2,617,293 | 11/1952 | Schnadt . |
| 2,634,487 | 4/1953 | Rogers . |
| 3,228,238 | 1/1966 | Jentet . |
| 3,290,926 | 12/1966 | Montano . |
| 3,309,918 | 3/1967 | Scott et al. ........................ 73/860 X |
| 3,358,498 | 12/1967 | Wright .................................... 73/860 |
| 3,427,873 | 2/1969 | Mehdizadeh . |
| 3,491,586 | 1/1970 | Branger . |
| 3,587,303 | 6/1971 | Corbett ................................. 73/795 |
| 3,662,591 | 5/1972 | Bons ..................................... 73/860 |
| 3,680,367 | 8/1972 | Krafft . |
| 3,918,299 | 11/1975 | Donnadieu . |
| 3,937,071 | 2/1976 | Slota et al. . |
| 3,983,745 | 10/1976 | Juusola . |
| 3,994,159 | 11/1976 | George et al. . |
| 4,003,246 | 1/1977 | Cain . |
| 4,090,489 | 5/1978 | Barker .............................. 125/13 R |
| 4,137,757 | 2/1979 | Kovacs ................................. 73/860 |
| 4,149,406 | 4/1979 | Russenberger ...................... 73/775 |

FOREIGN PATENT DOCUMENTS 800799 2/1981 U.S.S.R. .

OTHER PUBLICATIONS

"Device for Mounting Test Pieces in Axial Loading Machines (Exchange of Experience)"; *Industr. Lab* (*USA*); vol. 36, No. 1, pp. 152–153; Jan. 1970; É. Ya. Filatov et al.

"Grip for Cyclic Testing of Compact Specimens Under Tension-Compression", E. A. Grin, Copyright 1981 by Plenum Publishing Corporation No. 0019-8447/81/47-06-0653, pp. 653–654.

*Primary Examiner*—Tom Noland
*Attorney, Agent, or Firm*—Richard E. Constant

[57] ABSTRACT

An apparatus and method for measuring the alignment of a clevis and pin type loading fixture for compact tension specimens include a pair of substantially identical flat loading ligaments. Each loading ligament has two apertures for the reception of a respective pin of the loading fixture and a thickness less than one-half of a width of the clevis opening. The pair of loading ligaments are mounted in the clevis openings at respective sides thereof. The loading ligaments are then loaded by the pins of the loading fixture and the strain in each loading ligament is measured. By comparing the relative strain of each loading ligament, the alignment of the loading fixture is determined. Preferably, a suitable strain gage device is located at each longitudinal edge of a respective loading ligament equidistant from the two apertures in order to determine the strain thereat and hence the strain of each ligament. The loading ligaments are made substantially identical by jig grinding the loading ligaments as a matched set. Each loading ligament can also be individually calibrated prior to the measurement.

16 Claims, 1 Drawing Sheet

MEASURING ALIGNMENT OF LOADING FIXTURE

The Government has rights in this invention pursuant to Contract No. De-AC12-76SN00052 awarded by the U.S. Department of Energy.

FIELD OF THE INVENTION

The present invention relates generally to the measuring of the alignment of a clevis and pin type loading fixture, and more particularly to the use of two loading ligaments for determining the alignment of the loading fixture.

BACKGROUND OF THE INVENTION

Throughout the laboratory, mechanical testing of various types is conducted using pinned clevis fixtures to transmit test loads to a range of specimen configurations. The accuracy of such tests is a function of the test sample alignment relative to the axis of loading. Thus, to insure reliable and repeatable test results, fixture induced specimen bending must be kept to a minimum. ASTM provides specific recommendations as to measuring and minimizing misalignment for some specimen configurations. For example, a detailed description is given of an instrumented specimen and test procedure to establish less than 10% bending 30 KSI for sharp notched cylindrical tension specimens; for low cycle fatigue testing of axial configured specimens, maximum bending must be less than or equal to 5% of the minimum axial strain range.

However, ASTM is vague with respect to pin loaded specimens. For example, the ASTM alignment recommendation for fracture toughness testing of compact tension specimens is to minimize the eccentricity of the pull rods to within 30 mils. This is not always adequate to ensure the desired straight, uniform crack fronts. Misalignment should be maintained at less than or equal to 5%. Verification of this requirement has proven difficult.

One presently employed technique utilizes a modified compact tension specimen provided with a strain gage on either side of the preformed notch. Such a specimen is installed in the load train and individual strain readings are obtained over a given load range. The specimen is then reinstalled, following a 180° rotation in the horizontal plane, allowing inherent specimen error due to machining, gage placement, etc. to be arithmetically canceled. Any remaining error in the various readings is then attributed to fixture misalignment.

In practice, this prior procedure has produced data which is inconsistent (non-repeatable) and difficult to interpret due to the many variables in a typical load train. In addition, the specimen configuration itself results in the following disadvantages: (1) machining tolerances in section thickness and hole placement or parallelism not tight enough for alignment standard requirements; (2) time consuming multiple orientation test requirements; (3) low strain outputs at typical test loads excessively weight small differences; and (4) inherent error due to typical relative gage placement errors.

In U.S. Pat. No. 2,290,868 (Eriksson), an apparatus for testing the tensile strength of materials is disclosed. Two equal test specimens are used with this apparatus, one of which is subjected to a tensile load while the other compensates for any temperature induced variations in length not related to the applied tensile load.

A method and apparatus for testing materials is disclosed in U.S. Pat. No. 2,356,763 (Keinath). The material to be tested is stressed in series with a standard piece according to the method. The behavior of the tested material is then related to the known behavior of the standard piece.

A tensile testing apparatus is disclosed in U.S. Pat. No. 2,534,980 (Lubahn). This apparatus utilizes an elongate test specimen which is divided into two different testing lengths provided between end cross heads and a middle head. The elongation under tension is measured between the two lengths located between the three heads, and the difference in the amount of the two elongations is equal to the elongation of the extra length provided on one side of the middle head.

In U.S. Pat. No. 2,617,293 (Schnadt), specimens for use in determining the brittleness of materials are disclosed. In one disclosed specimen, a cylindrical channel is drilled adjacent a test notch in the sample. A core member is then inserted in the channel to reduce the plastic deformation which would otherwise occur during testing of the specimen.

A fatigue testing apparatus for testing a least one pair of propellers is disclosed in U.S. Pat. No. 3,290,926 (Montana). The blades of the pair are mounted side by side and coupled together so that when a motor loads the pair of blades, the coupled blades are equally loaded.

A corrosion fatigue stressing apparatus and method is disclosed in U.S. Pat. No. 3,427,873 (Mehdizadeh). With this apparatus, a plurality of similar specimens are tested in a corrosive environment while the specimens are under stress.

An apparatus for fatigue testing a plurality of test rods is disclosed in U.S. Pat. No. 3,491,586 (Branger). The test rods are located about a pitch diameter and are simultaneously loaded in equal amounts with the apparatus.

In U.S. Pat. No. 3,680,367 (Krafft), a multispecimen fatigue cracking machine is provided for fatigue cracking a plurality of test specimens. The specimens are equiangularly located about a circular arbor so as to be repetitively flexed. A fatigue apparatus for fatigue testing a plurality of similar elements at respective test stations is also disclosed in U.S. Pat. No. 3,937,071 (Slota).

Other apparatuses and methods of general interest relating to tensile testing are disclosed in the following U.S. Pat. Nos.: 2,634,487 (Rogers); 3,228,238 (Jentet); 3,994,159 (George et al.); 3,918,299 (Donnadieu); 3,983,745 (Juusola); 4,003,246 (Cain); 4,090,489 (Barker); and 4,149,406 (Russenberger). Also of general interest is Soviet Union Pat. 800,799 and "Grip for Cyclic Testing of Compact Specimens Under Tension-Compression", E. A. Grin, Copyright 1981 by Plenum Pulishing Corporation No. 0019-8447/81/4706-0653.

SUMMARY OF THE INVENTION

In accordance with the present invention, an apparatus and method are provided for measuring alignment (transverse uniformity of load application) of clevis and pin type loading fixtures used for compact tension specimens. Initially, a pair of substantially identical flat loading ligaments are provided having two apertures for the reception of a respective pin of the loading fixture. The thickness of each loading ligament is chosen with the particular load to be tested in mind. Thus, the optimal ligament thickness is the thinnest which will be within the elastic limit thereof while still producing an ample strain signal when subjected to the load of interest. The loading ligaments are mounted on the pins at respective sides of the clevis opening. A strain measuring means is then provided for measuring strain in each loading ligament applied by the pins of the loading fixture. With this measuring means, the relative strains in each loading ligament are compared to determine alignment.

In a preferred embodiment, a comparing means is provided for comparing the measured strains of the two loading ligaments. The measuring means also preferably includes a plurality of strain gage means, so as to cancel any bending effects within a ligament, respectively located at each longitudinal edge of a respective loading ligament and located equal distances from each aperture. These gage means produce a strain signal for each location which is fed to the comparing means.

In order to produce substantially identical loading ligaments, the loading ligaments are preferably jig ground as a matched set. These loading ligaments are also preferably rectangular parallelepipeds.

It is an advantage of the present invention that a relatively quick and easy test of the alignment of a loading fixture is possible with high accuracy.

It is also an advantage of the present invention that for testing such as J-Integral and Plane-Strain Fracture Toughness, where straightness of the fatigue crack front is a validity requirement, the present invention improves that accuracy while reducing the number of invalid tests.

Other features and advantages of the present invention are stated in or apparent from a detailed description of a presently preferred embodiment of the invention found hereinbelow.

DETAILED DESCRIPTION OF THE PREFERRED EMBODIMENT

Figure 1:
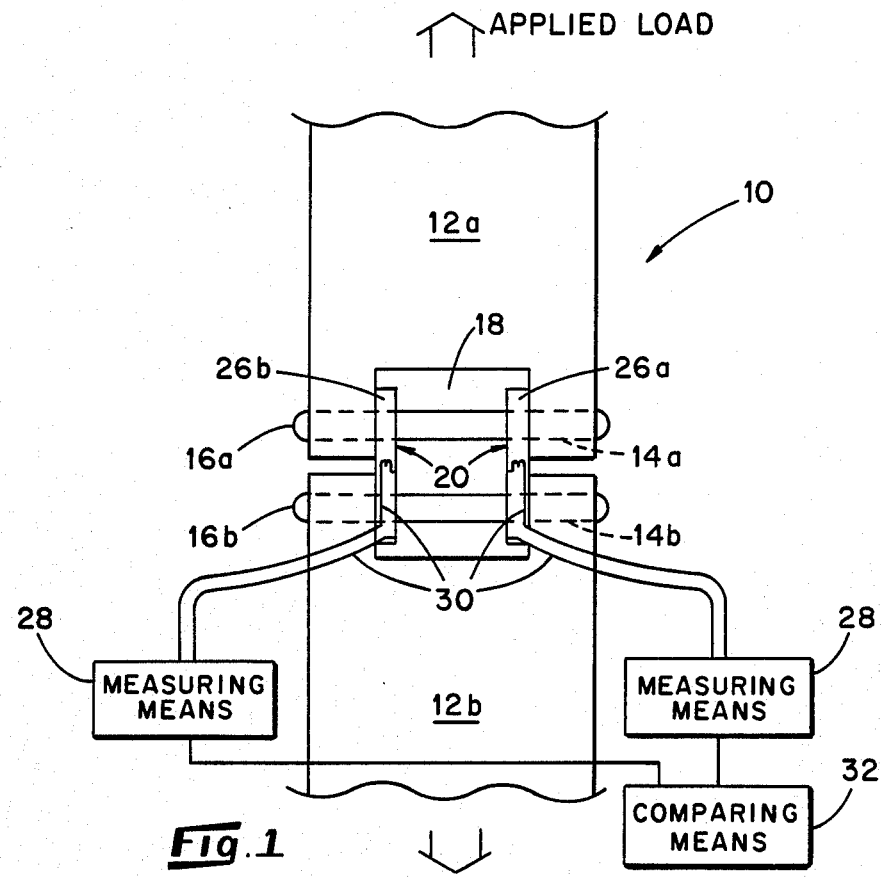
FIG. 1 is a schematic front elevation view of a clevis and pin type loading fixture provided with loading ligaments according to the present invention.

With reference now to the drawings in which like numerals represent like elements throughout the several views, a portion of a clevis and pin-type loading fixture 10 is depicted in FIG. 1. Loading fixture 10 includes respective clevises 12a and 12b having respective apertures 14a and 14b therethrough. Respective pins 16a and 16b are received in respective apertures 14a and 14b. Between clevises 12a and 12b, an opening 18 is provided in which a compact test specimen is ordinarily received. Testing is then performed by pulling clevises 12a and 12b away from one another as indicated by the applied load arrows.

Figure 2:
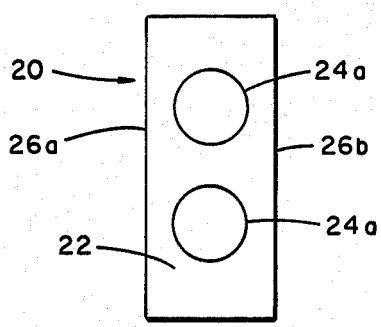
FIG. 2 is a side elevation view of the loading ligament depicted in FIG. 1.
Figure 3:
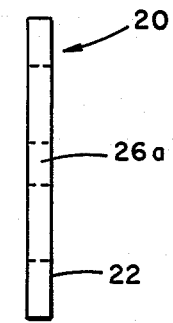
FIG. 3 is a front elevation view of the loading ligament depicted in FIG. 2.

According to the present invention, two loading ligaments 20 are provided in opening 18. Loading ligaments 20 are located on each lateral side of opening 18 as shown. With reference to FIGS. 2 and 3, it can be seen that each loading ligament 20 is a parallelepiped having a rectangular face 22 in which apertures 24a and 24b are provided. Apertures 24a and 24b are sized to slidably receive respective pins 16a and 16b. Each ligament 20 also includes opposite lateral edges 26a and 26b which are also rectangularly shaped.

A strain measuring means 28 is provided for measuring the strain in each loading ligament 20. Each strain measuring means 28 includes two strain gage means 30 which measure the strain along each lateral edge 26a and 26b of a respective loading ligament 20. Strain gage means 30 are centered between apertures 24a and 24b and wired in series as a quarter bridge. The reading of respective measuring means 28 are then fed to a comparing means 32 which compares the measured strains of respective loading ligaments 20.

It should be appreciated that loading ligaments 20 are designed to be identical insofar as possible. Thus, loading ligaments 20 are made of an identical material and have identical sizes and shapes. Preferably, to assure that loading ligaments 20 are identical, two loading ligaments 20 are jig ground as a matched set to minimize machining errors. The two loading ligaments 20 machines as a set are then used with each other as a matched pair. For convenience, each loading ligament of a matched pair can be suitably marked for identification in case other sets are used as well.

In operation, the alignment of clevis and pin type loading fixture 10 for both pins 16a and 16b and for clevises 12a and 12b is measured as follows according to the present invention. Initially, a pair of matched loading ligaments 20 are located in opening 18 adjacent the respective sides thereof. Each loading ligament 20 includes a suitable strain measuring means 28 as described above. Loading fixture 10 is then suitably loaded so that loding ligaments 20 are loaded simultaneously. The loading of each loading ligament 20 is then suitably compared as by comparing means 32. Comparing means 32 may comprise a suitable mechanism for producing strain curves for each loading ligament 20 which are then compared. If desired, it should be appreciated that each loading ligament of the pair can be individually calibrated to determine any small difference in response to loads prior to installation in loading fixture 10 when determining alignment.

It should be appreciated that each loading ligament 20 preferably has a relatively thin cross section relative to the width of opening 18. This thin cross section minimizes errors due to hole non-parallelism. To achieve this result, it is suggested that each load ligament have a width which will still be within the elastic limit thereof while producing an ample strain signal when subjected to the selected loading. The maximum thickness allowed is slightly less than one half of the width of opening 18.

It should also be appreciated that the reduced cross section results in high strain outputs for finer resolution. The cross section is thus also chosen for each specimen so as to be near the ASTM sharp notched cylindrical specimen recommended levels. The ability to chose the specific cross section of loading ligaments 20 also allows easy modification to suit different test load ranges desired.

It should further be appreciated that the ability to individually calibrate each loading ligament allows a single alignment run to yield the necessary data to characterize the loading fixture. This is a significant time savings compared to the prior art method discussed above.

It should still further be appreciated that the axial placement of strain gage means 30 helps minimize errors due to relaative gage placement by eliminating the ampliffying effect of a loading moment. Such a loading moment is a source of error in the modified compact tension specimens as described above when used in the prior art methods.

Tests have been performed using the present invention to determine the usefulness of the present invention. Initally, two sets of loading ligaments 20 were prepared. Individual loading ligament calibration was conducted on a 10 KIP Instron screw-type machine with a load train consisting of an upper universal joint, a 1 KIP ring dynamometer and 0.2 T compact tension clevises of ASTM E-399 flat bottom configuration. Following exercising of the train to full test load of 1,000 pounds, strain versus load curves were obtained for each loading ligament in 100 pound increments. A linear regression best fit slope and intercept was computed for each individual loading ligament. This calibration produced strain data linear to +/−1% with a maximum difference between loading ligaments of less than 1.5%. Maximum variation in best fit slopes of a set was 1.5%.

Prior to these tests, it was thought that it might be necessary to overload a matched set simultaneously on a common pin. This would be done to cause yielding of the pin holes to insure a matched hole spacing prior to the gaging described above. However, in view of the results discussed above, and as machined hole spacing was equivalent between matched set ligaments within <0.0005 inches, it was apparent that this additional overload step was not necessary.

An alignment test was then conducted after replacing the 0.2 T clevises with a 0.4 T set and the 1 KIP ring dynamometer with a 2 KIP capacity ring. A loading ligament set was then installed in the clevises and manually spaced flat against the clevis sides as depicted in FIG. 1. The clevis sides, in turn, were maintained in line with a gaged block. Following train exercising, strain versus load curves for each loading ligament in 200 pound train load increments (100 pound per ligament) up to 2000 pounds train load (1000 pounds per ligament nominal) were generated.

While one objective of the present invention is to eliminate the need for a second data run following 180° horizontal specimen rotation, this step was nonetheless performed in these tests and a second data set obtained to investigate specimen set consistency. The specimen sets did show very good consistency.

Thus, using the calibration data, it is possible to compute the actual load on each clevis side independently. The sum of the load on each side is thus a direct reading of total train load. Ideally, this total load would be uniformly shared by each ligament. However, deviation of a ligament from one-half of the total load, which is preferably reported as nominal load per ligament, is then a measure of fixture misalignment.

In the test fixture using the 0.4 T clevises, a sample loading ligament set indicated the calibration train to be aligned to less than +/−1% throughout the train load range of 800 to 2,000 pounds (400 to 1,000 pounds per ligament). Use of another set also showed this same alignment and thus the repeatability of the present invention.

To verify a loading ligament pairs' ability to quantify a misaligned fixture condition, a fixture was specifically rigged in order to be misaligned. Misalignment of the fixture was made possible by the introduction of a repeatable misaligning force to the load train by means of a dead weight side load. In particular, a ligament specimen pair was loaded to 1,400 pounds, which is value within its optimum operating range. The bending magnitude and direction were then determined. Thereafter, a 20 pound side load was applied and the effect of the side load on bending magnitude and direction was determined. The side load was then removed and bending measurements again taken to confirm the train return to the original condition.

The results of the misalignment test showed that alignment data prior to and following removal of the misalignment load were equal within 0.2% in all cases. Misalignment due to the 20 pound side load was consistently measured at 7.1% +/−0.5%.

For comparison, the prior art compact test specimen method described above was also used to measure the same misalignment of the loading fixture. The prior art test specimen exhibited significant variations in strain versus load curves gage-to-gage and poor repeatability with numerous non-repeatable data runs made prior to obtaining three successive runs. The resulting indicated misalignment using this prior technique was approximately a factor of 3.5 greater than that determined with the loading ligaments of the present invention. In addition, the induced misalignment testing results produced even larger disagreement, although use of a best fit analysis technique resulted in good correlation with the dual loading ligament specimens.

From the above, it is evident that the loading ligament pairs of the present invention allow for an accurate and repeatable quantifying of load train alignments. Once calibrated, a significant reduction in man hours required to characterize a train is also realized. The elimination of the need to repeat data runs following a 180° horizontal specimen rotation results in an approximately 50% reduction in the required setup and test time while also reducing the data uncertainty bands.

With appropriate dimensional adjustments, it is evident that the present invention can be used with any pin loaded axial specimen fixture. However, it must be appreciated that inaccuracy increases as specimen stress level decreases. Therefore, the ligament set total cross-sectional area should be adjusted to optimize the set to the desired load range. Roughly 30 KSI per ligament at peak load of interest as recommended by ASTM for notched round tensile alignment, and as used in the above-described test for a 2,000 pound train load, is satisfactory. It may also be advantageous to facilitate dual ligament specimen handling, particularly with regard to remote manipulation. In order to accomplish this, a combination handle and leaf spring spacing attachment may be possible. Alternatively, the calibrated set could be potted as a unit in RTV.

It is also possible to qualify a calibration train with a dual ligament specimen and use train the characterize other specimens of the current modified compact configuration for actual in-service use. In addition to handling ease, a cost savings may be realized in specimen fabrication by using onehigh precision dual ligament set to calibrate available modified compact tension specimens.

While the present invention has been described with respect to an exemplary embodiment thereof, it will be understood by those of ordinary skill in the art that variations and modifications can be effected within the scope and spirit of the invention.

I claim:

1. An apparatus for measuring alignment of clevis and pin type loading fixtures comprising:
   a pair of substantially identical flat loading ligaments, each said loading ligament having two apertures for reception of a respective pin of the loading fixture and having a thickness less than one-half of a width of a clevis opening of the loading fixture such that said pair of loading ligaments are mounted on the pins at respective sides of the clevis opening;

strain measuring means for measuring strain in each loading ligament applied by the pins of the loading fixture whereby the relative strains in each loading ligament are compared to determine alignment; and comparing means for comparing the measured, strains of said two loading alignments.

2. An apparatus for measuring alignment as claimed in claim 1 wherein said measuring means includes a plurality of strain gage means respectively located at each longitudinal edge of a respective loading ligament and located equidistant from each said aperture for producing a strain signal for each location which is fed to said comparing means.

3. An apparatus for measuring alignment as claimed in claim 1 wherein said loading ligaments are jig ground as a matched set.

4. An apparatus for measuring alignment as claimed in claim 1 wherein said loading ligaments are rectangularl parallelepipeds.

5. A method for measuring alignment of clevis and pin type loading fixtures for compact tension specimens comprising the steps of:

mounting on loading pins in a loading fixture at each respective side of a clevis opening respective one of a pair of loading ligaments, each loading ligament of a pair being substantially identical to the other and each loading ligament having two respective apertures through which a respective pin is received and a thickness less than one-half of a width of the clevis opening;

loading the pair of loading ligament with the pins of the loading fixture;

measuring the strain in each loading ligament caused by the pins of the loading fixture; and comparing the relative strain of each loading ligament with the other to determine the alignment of the loading fixture.

6. A method for measuring alignment as claimed in claim 5 including the steps of loading the loading ligaments at a plurality of different strains, measuring the strains at each one of the plurality of loads, and comparing the strains at each one of the loads.

7. A method for measuring alignment as claimed in claim 5 wherein the measuring step includes the determining of the strain at each longitudinal edge of a respective loading ligament at a position equidistant from respective apertures of the respective loading ligament.

8. A method for measuring alignment as claimed in claim 5 including the initial step of jig grinding the loading ligaments as a matched set.

9. A method for measuring alignment as claimed in claim 5 including the initial step of individually calibrating each loading ligament.

10. In a loading fixture apparatus having a pair of opposed axially aligned, spaced clevises for applying axial loads to a pin supported test specimen, wherein adjacent end portions of each clevis have spaced leg portions extending therefrom along a longitudinal axis of the clevis to define an opening therebetween for receiving a test specimen, and wherein leg portions of the clevises are provided with aligned, transverse apertures for receiving pins for mounting a test specimen in the clevis opening between the spaced leg portions, an apparatus for measuring alignment of the clevis and pin type loading fixture comprising:

a pair of substantially identical flat loading ligaments, each said loading ligament having two apertures for reception of respective pins of the spaced clevises of the loading fixture and having a thickness less than one-half of a width of the clevis opening of the loading fixture such that said pair of loading ligaments are mounted on the pins at respective sides of the clevis opening;

strain measuring means for measuring strain in each loading ligament applied by the pins of the loading fixture whereby the relative strains in each loading ligament are compared to determine alignment, and a comparing means for comparing the measuring strains of said two loading alignments.

11. An apparatus for measuring alignment as claimed in claim 10 wherein said measuring means includes a plurality of strain gage means respectively located at each longitudinal edge of a respective loading ligament and located equidistant from each said ligament aperture for producing a strain for each location which is fed to said comparing means.

12. An apparatus for measuring alignment as claimed in claim 10 wherein said loading ligaments are jig ground as a matched set.

13. An apparatus for measuring alignment as claimed in claim 10 wherein said loading ligaments are rectangular parallelepipeds.

14. A method for measuring the alignments of a loading fixture for compact tension specimens, in which the loading fixture has a pair of axially aligned, spaced clevises for applying axial loads to a pin supported test specimen, wherein adjacent end portions of each clevis have spaced leg portions extending therefrom and spaced from each other about a longitudinal axis of the clevis to define an opening therebetween for receiving a test specimen, and wherein leg portions of each clevis are provided with aligned, transverse apertures for receiving pins for mounting a pair of flat loading ligaments in the clevis opening between the spaced leg portions, wherein the method steps comprise:

mounting the pair of loading ligaments into the clevis opening and inserting mounting pins through respective apertures of the clevis leg portions and the pair of loading ligaments, wherein each loading ligament of a pair being substantially identical to the other and each loading ligament having two respective apertures through which a respective pin is received and a having thickness less than one-half of a width of the clevis opening;

loading the pair of loading ligaments with the pins of the loading fixture;

measuring the strain in each loading ligament caused by the pins of the loading fixture; and comparing the relative strain of each loading ligament with the other to determine the alignment of the loading fixture.

15. A method for measuring alignment as claimed in claim 14 including the steps of loading the ligaments at a plurality of different strains, measuring the strains at each one of the plurality of loads, and comparing the strains at each one of the loads.

16. A method for measuring alignment as claimed in claim 14 wherein the measuring step includes determining the strain at each longitudinal edge of a respective loading ligament at a position equidistant from the respective apertures of the respective loading ligament.

* * * * *